United States Patent
Wei et al.

(10) Patent No.: US 7,660,529 B2
(45) Date of Patent: Feb. 9, 2010

(54) SYSTEM AND METHOD FOR PROVIDING FAILURE PROTECTION IN OPTICAL NETWORKS

(75) Inventors: Guo Wei, Shenzhen (CN); Xuliang Zhang, Shenzhen (CN); Tao Jiang, Shenzhen (CN); Jun Zhao, Shenzhen (CN); Wei Huang, Shenzhen (CN); Jun Chen, Shenzhen (CN); Yuntao Wang, Shenzhen (CN); Huafeng Lin, Shenzhen (CN); Feng Wang, Shenzhen (CN)

(73) Assignee: Huawei Technologies Co., Ltd., Shenzhen, Guangdong Province (CN)

( * ) Notice: Subject to any disclaimer, the term of this patent is extended or adjusted under 35 U.S.C. 154(b) by 582 days.

(21) Appl. No.: 11/517,815

(22) Filed: Sep. 8, 2006

(65) Prior Publication Data

US 2008/0063405 A1    Mar. 13, 2008

(51) Int. Cl.
*H04B 10/08* (2006.01)
*H04B 10/04* (2006.01)
*H04J 14/02* (2006.01)

(52) U.S. Cl. ............... 398/93; 398/33; 398/95; 398/192; 398/193; 398/195; 398/196

(58) Field of Classification Search ............. 398/25, 398/30–34, 82, 91, 93, 95, 158, 192–196
See application file for complete search history.

(56) References Cited

U.S. PATENT DOCUMENTS

| | | | |
|---|---|---|---|
| 6,049,405 A | | 4/2000 | Oberg |
| 7,099,578 B1 * | | 8/2006 | Gerstel .................. 398/5 |
| 7,447,424 B2 * | | 11/2008 | Hovakimyan et al. .......... 396/4 |
| 2004/0076431 A1 * | | 4/2004 | Mueller .................. 398/33 |
| 2005/0111847 A1 | | 5/2005 | Jasti et al. |
| 2005/0207753 A1 * | | 9/2005 | Touma .................. 398/32 |

FOREIGN PATENT DOCUMENTS

CN    1333960    1/2002

* cited by examiner

*Primary Examiner*—Dalzid Singh
(74) *Attorney, Agent, or Firm*—Townsend and Townsend and Crew, LLP

(57) ABSTRACT

A system and method for transmitting an optical signal. The system includes a first optical transmitter capable of transmitting a first optical signal under one or more first operating conditions, and the first optical signal corresponds to a first wavelength. Additionally, the system includes a second optical transmitter capable of transmitting a second optical signal under one or more second operating conditions, and the second optical signal corresponds to a second wavelength. Moreover, the system includes an optical multiplexer coupled to the first optical transmitter and the second optical transmitter and capable of generating a multiplexed optical signal, a detection component configured to determine at least whether the first optical transmitter satisfies one or more predetermined conditions, and a tunable optical transmitter capable of transmitting a third optical signal. The third optical signal corresponds to a third wavelength.

39 Claims, 11 Drawing Sheets

SYSTEM AND METHOD FOR PROVIDING FAILURE PROTECTION IN OPTICAL NETWORKS

CROSS-REFERENCES TO RELATED APPLICATIONS

Not Applicable

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK

Not Applicable

BACKGROUND OF THE INVENTION

The present invention relates in general to telecommunication techniques. More particularly, the invention provides a system and method for providing failure protection. Merely by way of example, the invention is described as it applies to optical networks, such as Wavelength Division Multiplex Passive Optical Networks, but it should be recognized that the invention has a broader range of applicability.

Recently, the demand for broadband access operations has increased rapidly. In order to meet the demand for high-bandwidth and high-capacity access, the industry often chooses the optical access communication network. However, the cost for some of the important components of the optical access communication network is relatively high. Thus, the industry is seeking ways to build a cost-effective optical network. Research on Passive Optical Network (PON) technology also has become increasingly popular. For example, the industry has witnessed the emergence of the ATM-based Passive Optical Network (APON), the Broadband Passive Optical Network (BPON), the Passive Optical Network based on Ethernet (EPON), the Gigabit Passive Optical Network (GPON), the Wavelength Division Multiplex Passive Optical Network (WDM-PON), and Optical Code Division Multiple Access Passive Optical Network (OCDMA-PON) and other optical networks.

Generally speaking, the Passive Optical Network is, for example, this type of a system: a service provider's Central Office (CO) and remote nodes are connected through a fiber optic trunk. The remote nodes are located near user locations and connected to Optical Network Terminals (ONTs) of the consumer side through a distributed fiber-optic. Since passive optical components are disposed in the remote nodes, thus, the PON often allows tremendous reduction in administrative levels and maintenance costs.

FIG. 1 is a simplified diagram for a conventional WDM-PON system. As shown in FIG. 1, multiple wavelengths provided by a CO are transmitted to a remote node (RN) through a single fiber optic, each wavelength $\lambda_i$ is transmitted to each $ONT_i$ through the wavelength division function of the RN, and the corresponding ONT can send uplink data and receive downlink data with the distributed wavelengths.

FIGS. 2(A) and (B) are simplified diagrams showing conventional failure of a laser transmitter and a laser receiver respectively. As shown in FIGS. 2(A) and (B), once a transmitter i or a receiver i fails, the channel i would consequently become unusable. A solution to this problem is to use a protection method.

For example, a conventional protection method uses an optical channel protection (OCP) module for transmission and an OCP module for reception in a WDM system. Hence the transmission system and the reception system each have at least a protection channel in addition to working channels. When one working channel fails, the WDM system sends a changeover request, and in response, the signals are changed over from the assigned working channel to the assigned protection channel. When the working channel failure is repaired, signals of the assigned protection channel are restored back to the working channel.

Hence it is highly desirable to improve techniques for providing failure protection.

BRIEF SUMMARY OF THE INVENTION

The present invention relates in general to telecommunication techniques. More particularly, the invention provides a system and method for providing failure protection. Merely by way of example, the invention is described as it applies to optical networks, such as Wavelength Division Multiplex Passive Optical Networks, but it should be recognized that the invention has a broader range of applicability.

According to an embodiment of the present invention, a system for transmitting an optical signal includes a first optical transmitter capable of transmitting a first optical signal under one or more first operating conditions, and the first optical signal corresponds to a first wavelength. Additionally, the system includes a second optical transmitter capable of transmitting a second optical signal under one or more second operating conditions, and the second optical signal corresponds to a second wavelength. Moreover, the system includes an optical multiplexer coupled to the first optical transmitter and the second optical transmitter and capable of generating a multiplexed optical signal, a detection component configured to determine at least whether the first optical transmitter satisfies one or more predetermined conditions, and a tunable optical transmitter coupled to the detection component and capable of transmitting a third optical signal. The third optical signal corresponds to a third wavelength. Also, the system includes an optical coupling component capable of receiving at least the multiplexed optical signal and the third optical signal and generating an output optical signal for transmission. If the first optical transmitter is determined not to satisfy the one or more predetermined conditions, the third wavelength is equal to the first wavelength.

According to another embodiment of the present invention, a method for transmitting an optical signal includes transmitting a first optical signal by a first optical transmitter, and the first optical signal corresponds to a first wavelength. Additionally, the method includes transmitting a second optical signal by a second optical transmitter, and the second optical signal corresponds to a second wavelength. Moreover, the method includes multiplexing at least the first optical signal and the second optical signal to generate a multiplexed optical signal, and determining whether the first optical transmitter satisfies one or more predetermined conditions. Also, the method includes if the first optical transmitter is determined not to satisfy the one or more predetermined conditions, transmitting a third optical signal corresponding to a third wavelength equal to the first wavelength, coupling at least the second optical signal and the third optical signal, and generating an output optical signal for transmission.

According to yet another embodiment of the present invention, a system for receiving an optical signal includes an optical demultiplexer capable of receiving a first input signal, and a first optical receiver coupled to the optical demultiplexer and capable of receiving a first optical signal under one or more first operating conditions. The first optical signal corresponds to a first wavelength. Additionally, the system includes a second optical receiver coupled to the optical demultiplexer and capable of receiving a second optical signal under one or more second operating conditions, and the second optical signal corresponds to a second wavelength. Moreover, the system includes a detection component configured to determine at least whether the first optical receiver satisfies one or more predetermined conditions, and an optical decoupling component capable of receiving at least a second input signal and generate the first input signal and a third input signal. The third input signal includes a third optical signal corresponding to a third wavelength. Also, the system includes a tunable optical receiver coupled to the detection component and capable of receiving the third optical signal corresponding to the third wavelength. If the first optical receiver is determined not to satisfy the one or more predetermined conditions, the third wavelength is equal to the first wavelength.

According to yet another embodiment of the present invention, the method for receiving an optical signal includes receiving a first input signal, and decoupling the first input signal to generate a second input signal and a third input signal. The third input signal includes a first optical signal corresponding to a first wavelength. Additionally, the method includes demultiplexing at least the second input signal to generate at least a second optical signal and a third optical signal. The second optical signal corresponds to a second wavelength, and the third optical signal corresponds to a third wavelength. Moreover, the method includes receiving the second optical signal to generate a first data signal, receiving the third optical signal to generate a second data signal, and determining whether the first data signal satisfies one or more predetermined conditions. Also, the method includes, if the first data signal is determined not to satisfy the one or more predetermined conditions, receiving the first optical signal corresponding to the first wavelength that is equal to the second wavelength, generating a third data signal based on at least information associated with the first optical signal, processing information associated with the second data signal and the third data signal, and generating a plurality of data based on at least information associated with the second data signal and the third data signal.

According to yet another embodiment of the present invention, the system for transmitting a plurality of optical signals includes a first optical transmitter capable of transmitting a first optical signal under one or more first operating conditions. The first optical signal corresponds to a first wavelength. Additionally, the system includes a second optical transmitter capable of transmitting a second optical signal under one or more second operating conditions. The second optical signal corresponds to a second wavelength. Moreover, the system includes a detection component configured to determine at least whether the first optical transmitter satisfies one or more predetermined conditions, and a tunable optical transmitter capable of transmitting a third optical signal. The third optical signal corresponds to a third wavelength. Also, the system includes a plurality of optical coupling components. The plurality of optical coupling components includes an optical coupling component. The optical coupling component is coupled to the first optical transmitter and the tunable optical transmitter, and is configured to generate an output optical signal for transmission. If the first optical transmitter is determined not to satisfy the one or more predetermined conditions, the third wavelength is equal to the first wavelength.

Many benefits are achieved by way of the present invention over conventional techniques. Some embodiments of the present invention can economically and/or efficiently solves problems of a random optical transmitter and/or receiver failure in the Central Office (CO). Certain embodiments of the present invention can improve reliability and/or robustness of downlink and/or uplink data communication in an optical network. Some embodiments of the present invention do not impose additional requirements on the regular optical transmitters and/or receivers for providing protection. Certain embodiments of the present invention do not impose additional requirements on a multiplexer and demultiplexer for providing protection. Some embodiments of the present invention do not impose demanding requirements on the emission power of a tunable optical transmitter. Certain embodiments of the present invention provide M:N protection by using M tunable optical transmitters for N regular wavelength channels. For example, $1 \leq M < N$. Some embodiments of the present invention do not require a system for signal transmission and a system for signal reception each have an optical channel protection module in a parallel manner. Certain embodiments of the present invention do not need to send a changeover request to the optical channel protection modules of both a transmission system and a reception system in a parallel manner. Some embodiments of the present invention provide failure protection for data transmission by transmitter changeover, instead of by wavelength changeover. Certain embodiments of the present invention provide failure protection for data reception by receiver changeover, instead of by wavelength changeover.

Depending upon embodiment, one or more of these benefits may be achieved. These benefits and various additional objects, features and advantages of the present invention can be fully appreciated with reference to the detailed description and accompanying drawings that follow.

DETAILED DESCRIPTION OF THE INVENTION

The present invention relates in general to telecommunication techniques. More particularly, the invention provides a system and method for providing failure protection. Merely by way of example, the invention is described as it applies to optical networks, such as Wavelength Division Multiplex Passive Optical Networks, but it should be recognized that the invention has a broader range of applicability.

Figure 1:
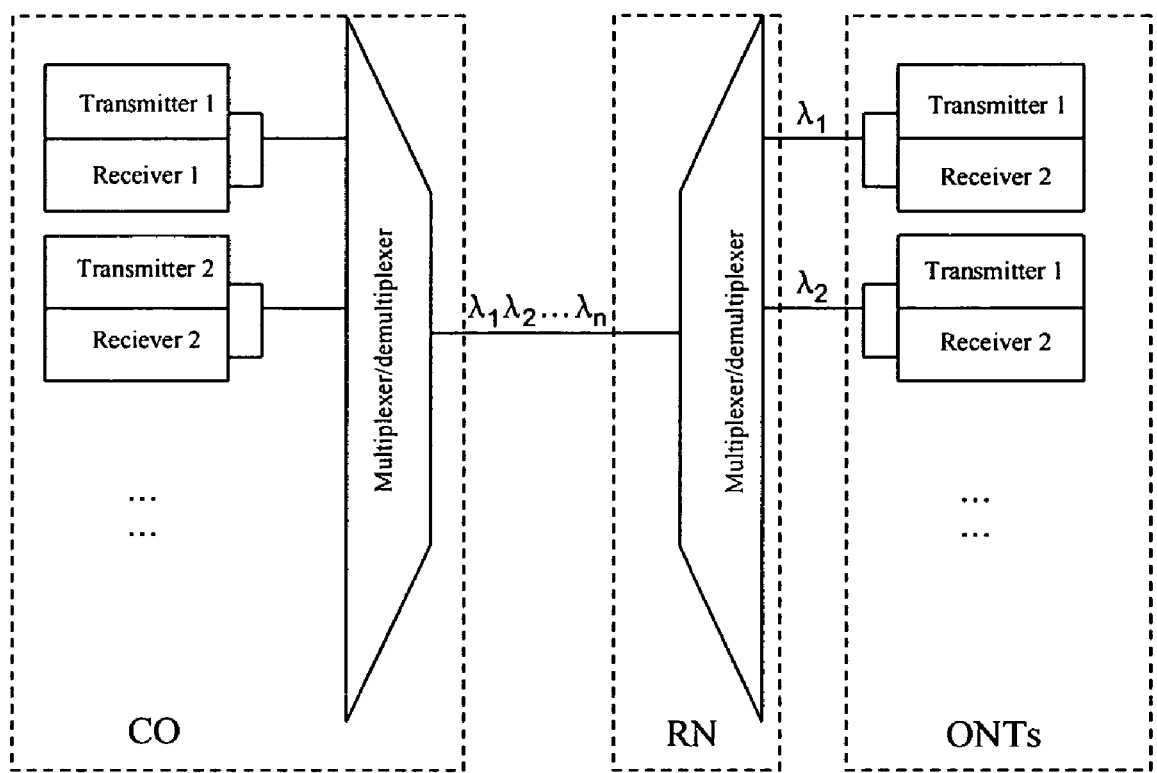
FIG. 1 is a simplified diagram for a conventional WDM-PON system.
Figure 2A:
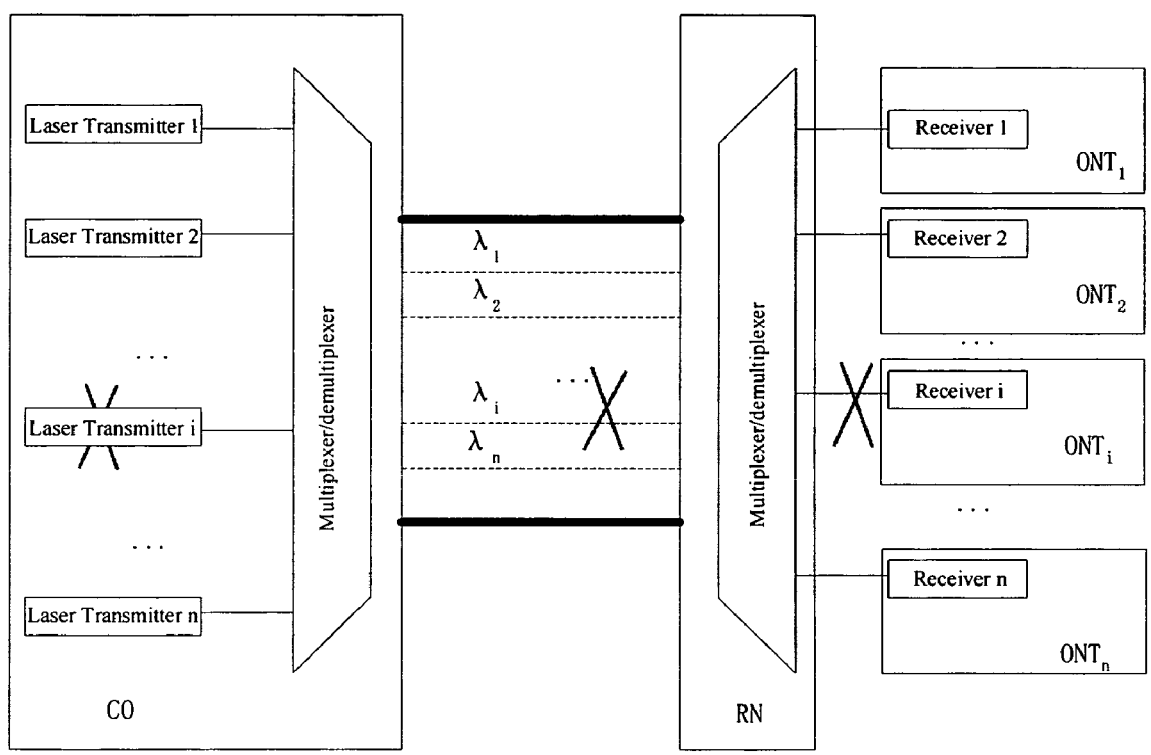
FIGS. 2(A) and (B) are simplified diagrams showing conventional failure of a laser transmitter and a laser receiver respectively.
Figure 2B:
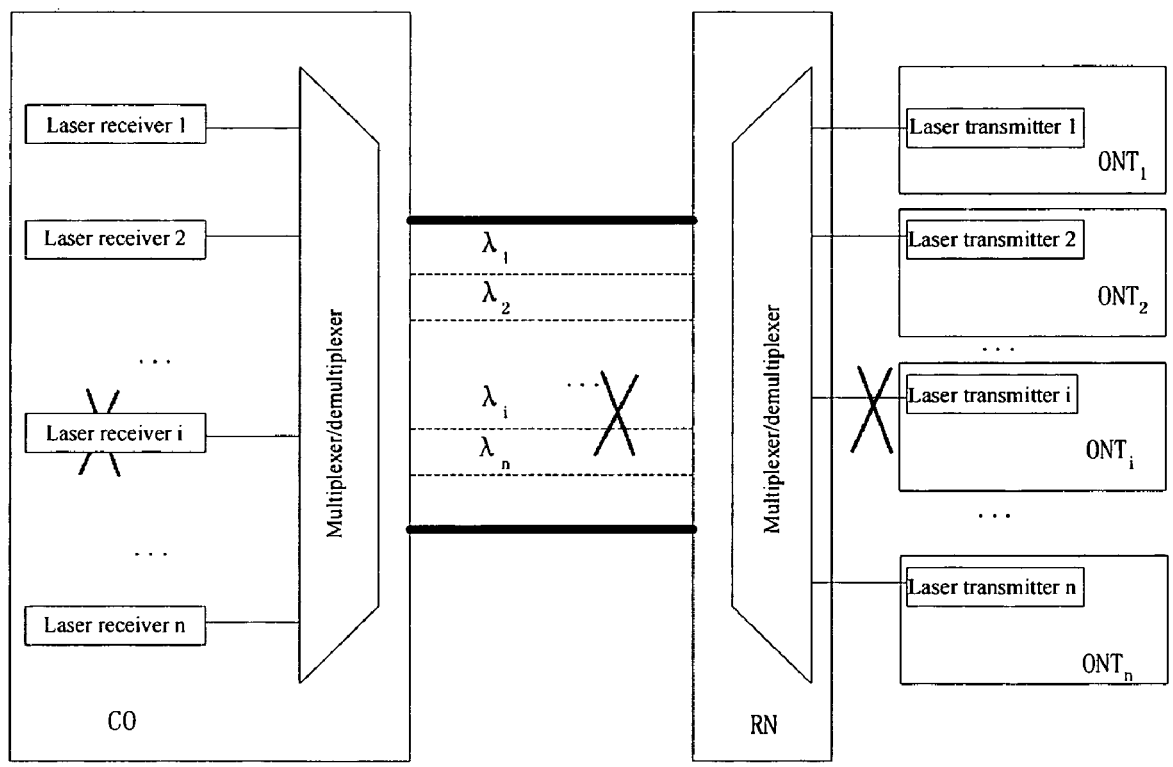

As shown in FIG. 1, the number of transmitters and receivers in the CO increases with the ever increasing number of channels (or the number of wavelengths). Therefore, the requirement for operation reliability of the transmitters and the receivers often is high. As shown in FIGS. 2(A) and (B), the WDM system often needs to send a channel changeover request to both the transmission system and the reception system in a parallel manner. Therefore the changeover process sometimes can be complicated.

Figure 3:
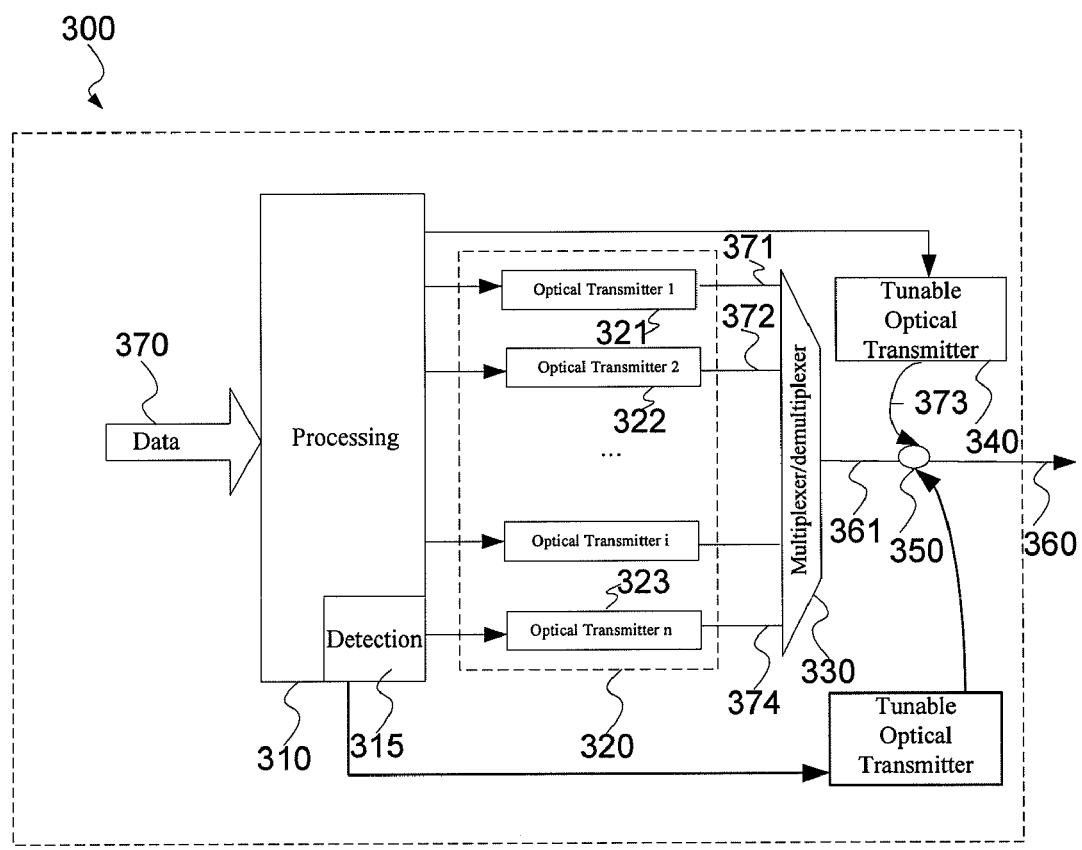
FIG. 3 is a simplified system for providing failure protection for data transmission according to an embodiment of the present invention.

FIG. 3 is a simplified system for providing failure protection according to an embodiment of the present invention. This diagram is merely an example, which should not unduly limit the scope of the claims. One of ordinary skill in the art would recognize many variations, alternatives, and modifications. The system 300 includes a processing component 310, a detection component 315, a plurality of optical transmitters 320, a multiplexer and demultiplexer 330, a tunable optical transmitter 340, and a coupling component 350. Although the above has been shown using a selected group of apparatuses for the system 300, there can be many alternatives, modifications, and variations. For example, the detection component 315 is a part of the processing component 310. In another example, the detection component 315 is not a part of the processing component 310. Other apparatuses may be inserted to those noted above. Depending upon the embodiment, the arrangement of apparatuses may be interchanged with others replaced. Further details of these apparatuses are found throughout the present specification and more particularly below.

The system 300 for providing failure protection has various applications. For example, the system 300 is used to transmit an optical signal 360 in an optical network. In another example, the optical network is a wavelength-division-multiplex passive optical network (WDM-OPN). According to an embodiment, the system 300 can transmit the optical signal 360 from a central office (CO) to one or more remote nodes (RNs).

As shown in FIG. 3, the plurality of optical transmitters 320 includes optical transmitters 1, 2, ..., i, ..., n. n is a positive integer. i is an integer equal to or larger than 1, and equal to or smaller than n. Each optical transmitter is capable of sending an optical signal at a predetermined wavelength to the multiplexer and demultiplexer 330 under at least one or more operating conditions. For example, each optical transmitter is a laser source or a laser emitter.

In one embodiment, the plurality of optical transmitters 320 includes at least an optical transmitters 321 and 322. The optical transmitter 321 is capable of transmitting an optical signal 371 under at least one or more operating conditions. The optical signal 371 corresponds to a wavelength $\lambda_1$. Additionally, the optical transmitter 322 is capable of transmitting an optical signal 372 under at least one or more operating conditions. The optical signal 372 corresponds to a wavelength $\lambda_2$. The wavelength $\lambda_2$ is different from the wavelength $\lambda_1$ according to an embodiment of the present invention. In another embodiment, the plurality of optical transmitters 320 also includes an optical transmitter 323, in addition to the optical transmitters 321 and 322. The optical transmitter 323 is capable of transmitting an optical signal 374 under at least one or more operating conditions. The optical signal 374 corresponds to a wavelength $\lambda_3$.

As shown in FIG. 3, each of the plurality of optical transmitters 320 is coupled to the multiplexer and demultiplexer 330. For example, the multiplexer and demultiplexer 330 includes an optical multiplexer. The optical multiplexer is coupled to the plurality of optical transmitters 320 and is capable of generating a multiplexed optical signal 361.

The detection component 315 is configured to determine whether the plurality of optical transmitters satisfies one or more predetermined conditions. For example, the detection component 315 can determine whether the optical transmitter 321 satisfies the one or more predetermined conditions. In one embodiment, if the optical transmitter 321 is determined not to satisfy the one or more predetermined conditions, the detection component 315 or the processing component 310 provides one or more instructions to shut down data transmission of the channel $\lambda_1$. In another embodiment, the process to determine whether the optical transmitter 321 satisfies the one or more predetermined conditions includes a process to determine whether the optical transmitter 321 fails.

As discussed above, the detection component 315 is either a part or not a part of the processing component 310. The processing component 310 is configured to receive a plurality of data 370. Additionally, the processing component 310 is coupled to the plurality of optical transmitters 320 and the tunable optical transmitter 340. For example, the processing component 310 includes a medium access controller (MAC).

The tunable optical transmitter 340 is coupled to the detection component 315 and/or the processing component 310, and is capable of transmitting an optical signal 373 under at least one or more operating conditions. The optical signal 373 corresponds to a wavelength $\lambda_t$. For example, the tunable optical transmitter 340 is capable of changing the wavelength $\lambda_t$ in magnitude. In another example, if the optical transmitter 321 is determined not to satisfy one or more predetermined conditions, the tunable optical transmitter 340 is configured to change the wavelength $\lambda_t$ so that the wavelength $\lambda_t$ becomes equal to the wavelength $\lambda_1$, and the optical signal 373 carries data information that should have been carried by the optical signal 371 had the optical transmitter 321 not been determined not to satisfy the one or more predetermined conditions.

As shown in FIG. 3, the tunable optical transmitter 340 is coupled to the optical coupling component 350. The optical coupling component 350 is capable of receiving at least the multiplexed optical signal 361 and the optical signal 373, and generating the optical signal 360 for transmission. For example, the optical signal 360 carries the plurality of data 370.

As discussed above and further emphasized here, FIG. 3 is merely an example, which should not unduly limit the scope of the claims. One of ordinary skill in the art would recognize many variations, alternatives, and modifications. For example, the optical transmitters 321 and 322 can be any two of the plurality of optical transmitters 320.

According to an embodiment, the system 300 includes another tunable optical transmitter in addition to the tunable optical transmitter 340. The another tunable optical transmitter is coupled to the detection component 315 and is capable of transmitting an optical signal corresponding to a wavelength $\lambda_{at}$. If the detection component 315 determines that the optical transmitter 322 does not satisfy one or more predetermined conditions, the wavelength $\lambda_{at}$ is adjusted to become equal to $\lambda_2$, and the optical signal generated by the another tunable optical transmitter carries data information that should have been carried by the optical signal 372 had the optical transmitter 322 not been determined not to satisfy the one or more predetermined conditions. The optical signal generated by the another tunable optical transmitter is also received by the optical coupling component 350, which can generate the optical signal 360 for transmission.

According to another embodiment, the technique of providing protection for data transmission is described as follows. The downlink data pass through the processing component 310 (e.g., a MAC controller). Afterwards, the downlink data from the respective channels are received by the respective independent transmitters of the plurality of optical transmitters 320, and then enter the multiplexer and demultiplexer 330. In one embodiment, the multiplexer and demultiplexer 330 is a passive component. The downlink data of multiple channels are multiplexed into a single downlink optical signal 361 and sent to a remote terminal through a coupling component 350. Once an optical transmitter (e.g., the optical transmitter i corresponding to channel wavelength $\lambda_i$) fails, the channel failure is detected by the detection component 315, and in response, a warning is provided to the optical network. The processing component 310, based on the channel failure information, instruct the tunable optical transmitter 340 to start to working and tuning its transmission wavelength to the channel wavelength $\lambda_i$. The downlink data of the channel i are then transmitted through the tunable optical transmitter 340, and combined with the single downlink optical signal 361 by the coupling component 350. For example, the single downlink optical signal 361 does not include any optical signal at the channel wavelength $\lambda_i$ after the failure of the optical transmitter i is detected. The combined signal 360 is sent from the coupling component 350 to the remote terminal. For example, the coupling component 350 is an optical coupler with at least two-way input.

Figure 4:
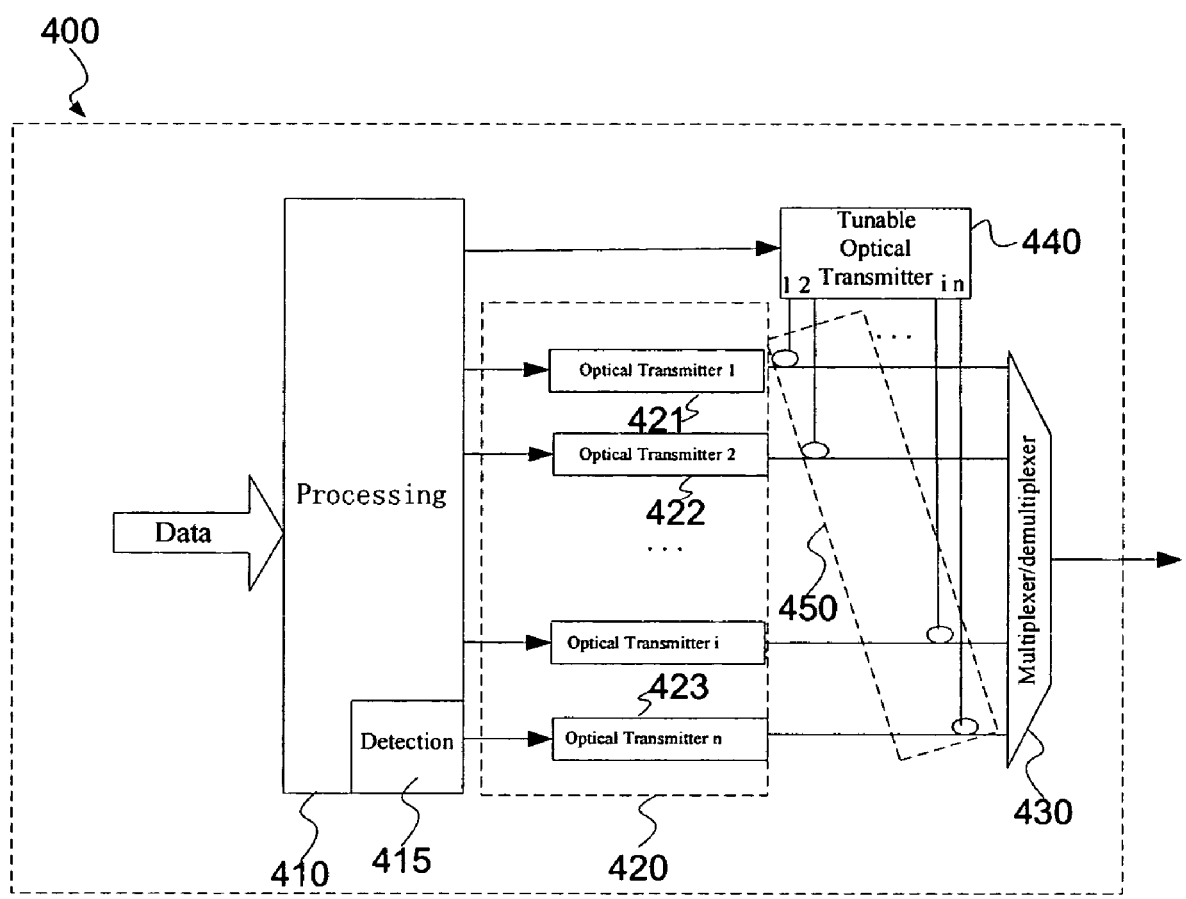
FIG. 4 is a simplified system for providing failure protection for data transmission according to another embodiment of the present invention.

FIG. 4 is a simplified system for providing failure protection according to another embodiment of the present invention. This diagram is merely an example, which should not unduly limit the scope of the claims. One of ordinary skill in the art would recognize many variations, alternatives, and modifications. The system 400 includes the processing component 410, the detection component 415, the plurality of optical transmitters 420, the multiplexer and demultiplexer 430, the tunable optical transmitter 440, and a plurality of coupling components 450. Although the above has been shown using a selected group of apparatuses for the system 400, there can be many alternatives, modifications, and variations. For example, some of the apparatuses may be expanded and/or combined. Other apparatuses may be inserted to those noted above. Depending upon the embodiment, the arrangement of apparatuses may be interchanged with others replaced.

The processing component 410, the detection component 415, the plurality of optical transmitters 420, and the multiplexer and demultiplexer 430 are similar to the processing component 310, the detection component 315, the plurality of optical transmitters 320, and the multiplexer and demultiplexer 330 respectively.

As shown in FIG. 4, the plurality of optical transmitters 420 includes optical transmitters 1, 2, . . . , i, . . . , n. n is a positive integer. i is an integer equal to or larger than 1, and equal to or smaller than n. Each optical transmitter is capable of sending an optical signal at a predetermined wavelength under at least one or more operating conditions. For example, each optical transmitter is a laser source or a laser emitter.

In one embodiment, the plurality of optical transmitters 420 includes at least optical transmitters 421 and 422. For example, the optical transmitters 421 and 422 are similar to the optical transmitters 321 and 322 respectively. In another example, the optical transmitters 421 and 422 are any two of the plurality of optical transmitters 420. The plurality of optical transmitters 420 are coupled to the plurality of coupling components 450. The plurality of coupling components 450 includes coupling components 1, 2, . . . , i, . . . , n. For example, the coupling component i is coupled to the output terminal i of the tunable optical transmitter 440. In another example, the coupling component i is similar to the coupling component 350.

As shown in FIG. 4, the tunable optical transmitter 440 includes a plurality of output terminals coupled to the plurality of coupling components 450 respectively. The plurality of output terminals includes output terminals 1, 2, . . . , i, . . . , n. Additionally, the tunable optical transmitter 440 is coupled to the detection component 415 and is capable of transmitting an optical signal at one of the plurality of output terminals under at least one or more operating conditions. The optical signal corresponds to a wavelength $\lambda_t$. For example, the tunable optical transmitter 440 is capable of changing the wavelength $\lambda_t$ in magnitude. In another example, if the optical transmitter 421 is determined not to satisfy one or more predetermined conditions, the tunable optical transmitter 440 is configured to change the wavelength $\lambda_t$ so that the wavelength $\lambda_t$ becomes equal to the wavelength $\lambda_1$. Accordingly, the optical signal is send to the coupling component 1 through the output terminal 1. In one embodiment, the optical signal carries data information that should have been carried by the optical signal generated by the optical transmitter 321 had the optical transmitter 321 not been determined not to satisfy the one or more predetermined conditions.

As discussed above and further emphasized here, FIG. 4 is merely an example, which should not unduly limit the scope of the claims. One of ordinary skill in the art would recognize many variations, alternatives, and modifications. For example, the multiplexer and demultiplexer 430 is removed.

Figure 5:
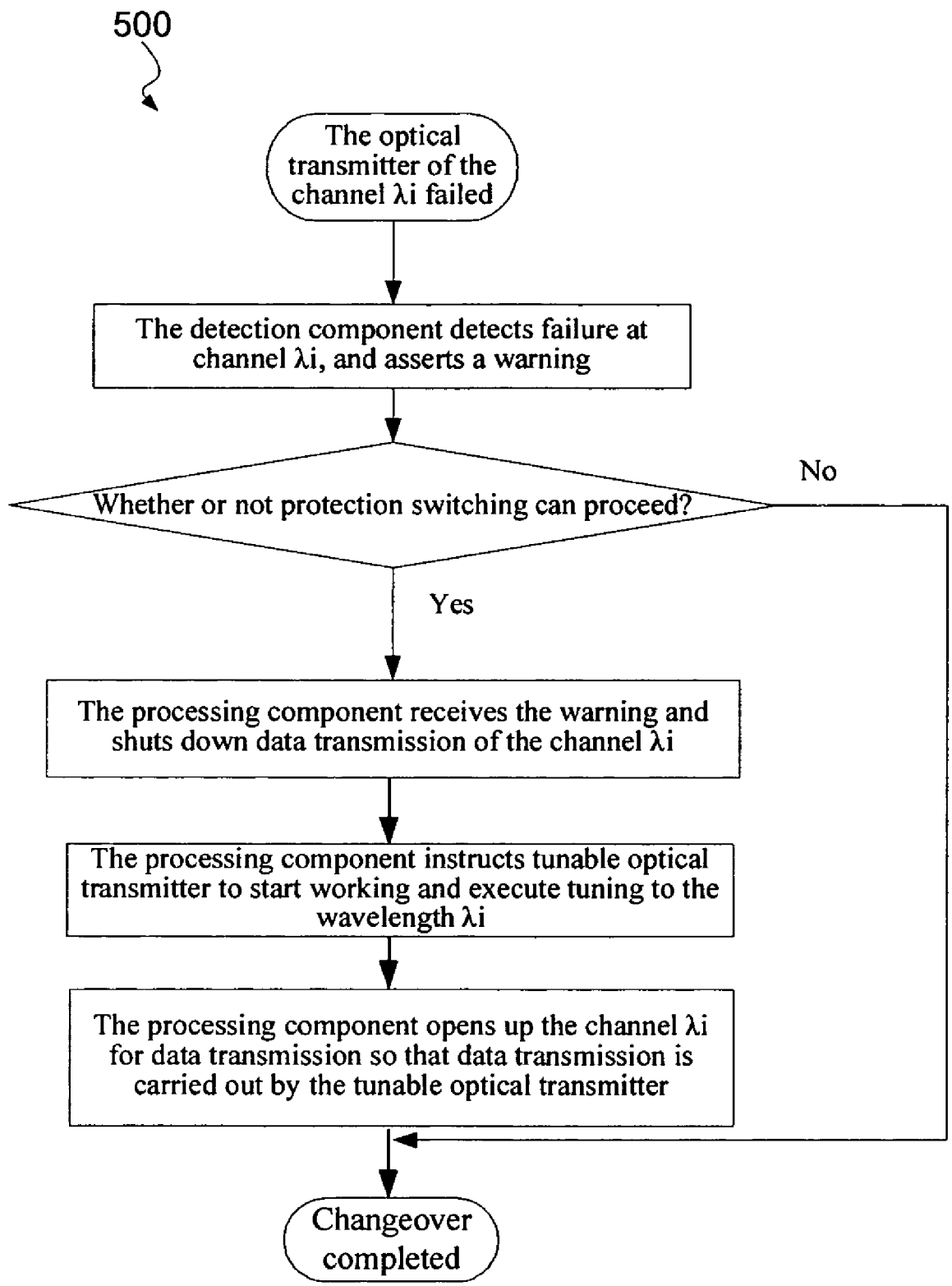
FIG. 5 is a simplified flow chart showing method for providing failure protection for data transmission according to an embodiment of the present invention.

FIG. 5 is a simplified method for providing failure protection according to an embodiment of the present invention. This diagram is merely an example, which should not unduly limit the scope of the claims. One of ordinary skill in the art would recognize many variations, alternatives, and modifications.

As an example, the method 500 is performed by the system 300. As shown in FIG. 5, when the optical transmitter of the channel $\lambda_i$ fails, the detection component 315 detects this failure. Then the detection component 315 provides, such as asserts, a warning message to the optical network such as "the optical transmitter i has failed", and then determines whether or not a protection switching can proceed. For example, this determination process takes into account whether the tunable optical transmitter 340 is available. If the protection switching can proceed, the processing component 310 receives the warning message and immediately shuts down the data transmission on the channel $\lambda_i$ and instructs the tunable optical transmitter 340 to starting working and tuning the wavelength $\lambda_t$ to the working wavelength $\lambda_i$. When the wavelength $\lambda_t$ has been tuned to the working wavelength $\lambda_i$, the protection component 315 or the processing component 320 opens up the channel $\lambda_i$ for data transmission through the tunable optical transmitter 340. For example, the optical transmitter i remains shut down. At this point, the changeover protection is completed.

According to another embodiment, the method 500 includes transmitting a first optical signal corresponding to a first wavelength, transmitting a second optical signal corresponding to a second wavelength, and multiplexing at least the first optical signal and the second optical signal to generate a multiplexed optical signal. Additionally, the method 500 includes determining whether the first optical signal satisfies one or more predetermined conditions. Moreover, the method 500 includes transmitting a third optical signal corresponding to a third wavelength and the third wavelength being equal to the first wavelength, if the first optical signal is determined not to satisfy the one or more predetermined conditions. Also, the method 500 includes if the first optical signal is determined not to satisfy the one or more predetermined conditions, coupling the multiplexed optical signal and the third optical signal, and generating an output optical signal for transmission.

Figure 6:
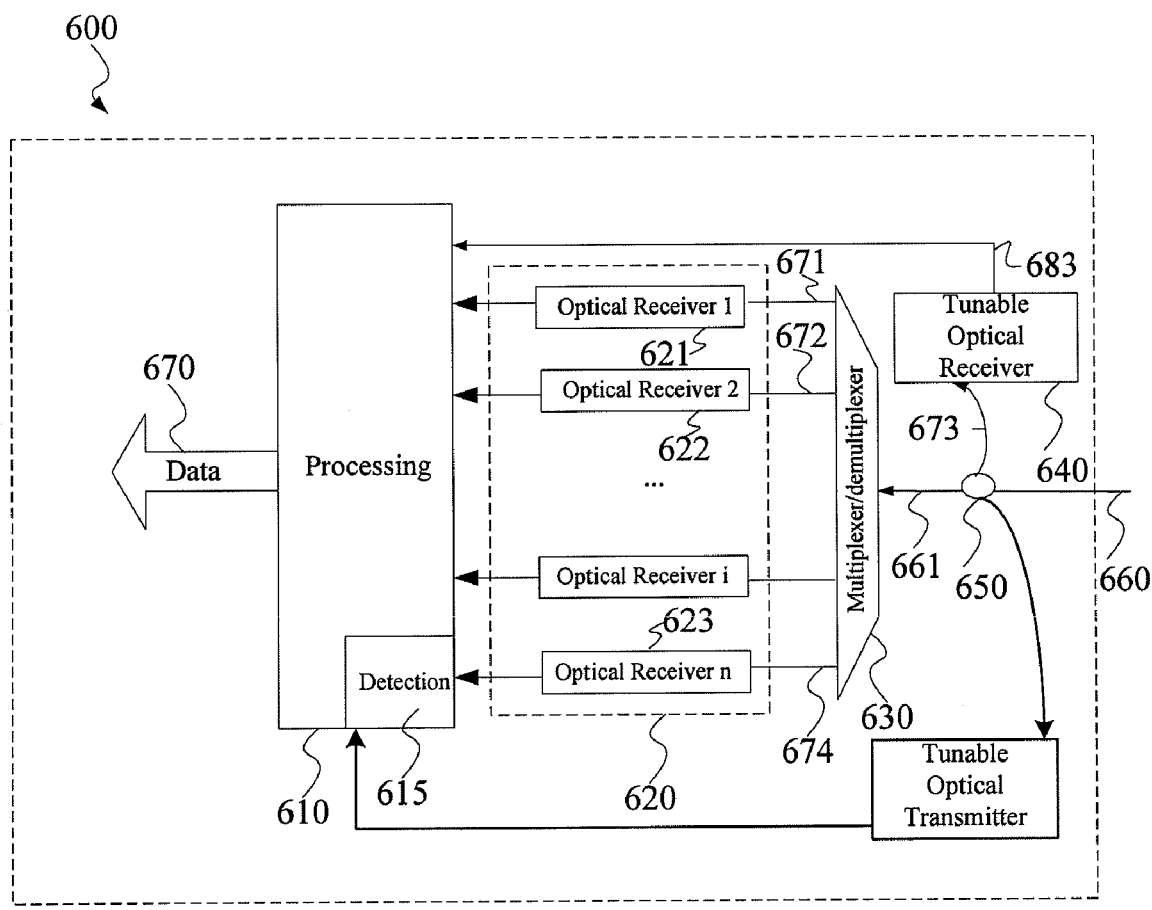
FIG. 6 is a simplified system for providing failure protection for data reception according to yet another embodiment of the present invention.

FIG. 6 is a simplified system for providing failure protection according to yet another embodiment of the present invention. This diagram is merely an example, which should not unduly limit the scope of the claims. One of ordinary skill in the art would recognize many variations, alternatives, and modifications. The system 600 includes a processing component 610, a detection component 615, a plurality of optical receivers 620, a multiplexer and demultiplexer 630, a tunable optical receiver 640, and a decoupling component 650. Although the above has been shown using a selected group of apparatuses for the system 600, there can be many alternatives, modifications, and variations. For example, the detection component 615 is a part of the processing component 610. In another example, the detection component 615 is not a part of the processing component 610. Other apparatuses may be inserted to those noted above. Depending upon the embodiment, the arrangement of apparatuses may be interchanged with others replaced. Further details of these apparatuses are found throughout the present specification and more particularly below.

The system 600 for providing failure protection has various applications. For example, the system 600 is used to receive an optical signal 660 in an optical network. In another example, the optical network is a wavelength-division-multiplex passive optical network (WDM-PON). According to an embodiment, the system 600 can receive the optical signal 660 at a central office (CO) from one or more remote nodes (RNs).

As shown in FIG. 6, the plurality of optical receivers 620 includes optical receivers 1, 2, . . . , i, . . . , n. n is a positive integer. i is an integer equal to or larger than 1, and equal to or smaller than n. Each optical receiver is capable of receiving an optical signal at a predetermined wavelength from the multiplexer and demultiplexer 630 under at least one or more operating conditions. For example, each optical receiver is a laser receiver.

In one embodiment, the plurality of optical receivers 620 includes at least optical receivers 621 and 622. The optical receiver 621 is capable of receiving an optical signal 671 under at least one or more operating conditions. The optical signal 671 corresponds to a wavelength $\lambda_1$. Additionally, the optical receiver 622 is capable of receiving an optical signal 672 under at least one or more operating conditions. The optical signal 672 corresponds to a wavelength $\lambda_2$. The wavelength $\lambda_2$ is different from the wavelength $\lambda_1$ according to an embodiment of the present invention. In another embodiment, the plurality of optical receivers 620 also includes an optical receiver 623, in addition to the optical receivers 621 and 622. The optical receiver 623 is capable of receiving an optical signal 674 under at least one or more operating conditions. The optical signal 674 corresponds to a wavelength $\lambda_3$.

As shown in FIG. 6, each of the plurality of optical receivers 620 is coupled to the multiplexer and demultiplexer 630. For example, the multiplexer and demultiplexer 630 includes an optical demultiplexer. The optical demultiplexer is coupled to the plurality of optical receivers 620 and is capable of receiving an optical signal 661.

The detection component 615 is configured to determine whether the plurality of optical receivers satisfies one or more predetermined conditions. For example, the detection component 615 can determine whether the optical receiver 621 satisfies the one or more predetermined conditions. In one embodiment, if the optical receiver 621 is determined not to satisfy the one or more predetermined conditions, the detection component 615 or the processing component 610 provides one or more instructions to shut down data reception of channel $\lambda_1$. In another embodiment, the process to determine whether the optical receiver 621 satisfies the one or more predetermined conditions includes a process to determine whether the optical receiver 621 fails.

As discussed above, the detection component 615 is either a part or not a part of the processing component 610. The processing component 610 is configured to generate a plurality of data 670. Additionally, the processing component 610 is coupled to the plurality of optical receivers 620 and the tunable optical receiver 640. For example, the processing component 610 includes a medium access controller (MAC).

The tunable optical receiver 640 is coupled to the detection component 615 and/or the processing component 610, and is capable of selecting and receiving the component at a wavelength $\lambda_t$ from an optical signal 673 under at least one or more operating conditions. For example, the tunable optical receiver 640 is capable of changing the wavelength $\lambda_t$ in magnitude. In another example, if the optical receiver 621 is determined not to satisfy one or more predetermined conditions, the tunable optical receiver 640 is configured to change the wavelength $\lambda_t$ so that the wavelength $\lambda_t$ becomes equal to the wavelength $\lambda_1$. An data signal 683 generated by the tunable optical receiver 640 carries data information that is carried by the optical signal 671.

As shown in FIG. 6, the tunable optical receiver 640 is coupled to the optical decoupling component 650. The optical decoupling component 650 is capable of receiving at least an optical signal 660 and generating the optical signal 661 and the optical signal 673. For example, the optical signal 660 carries the plurality of data 670.

As discussed above and further emphasized here, FIG. 6 is merely an example, which should not unduly limit the scope of the claims. One of ordinary skill in the art would recognize many variations, alternatives, and modifications. For example, the optical receivers 621 and 622 can be any two of the plurality of optical receivers 620.

According to an embodiment, the system 600 includes another tunable optical receiver in addition to the tunable optical receiver 640. The another tunable optical receiver is coupled to the detection component 615 and is capable of selecting and receiving an optical signal corresponding to a wavelength $\lambda_{at}$. If the detection component 615 determines that the optical receiver 622 does not satisfy one or more predetermined conditions, the wavelength $\lambda_{at}$ is adjusted to become equal to $\lambda_2$, and a data signal generated by the another tunable optical receiver carries data information that is carried by the optical signal 672. The optical signal selected and received by the another tunable optical transmitter is generated by the optical decoupling component 650, which can receive the optical signal 660.

According to another embodiment, the technique of providing protection for data reception is described as follows. The uplink data from the respective ONTs are demultiplexed with a multiplexer and demultiplexer 630. In one embodiment, the multiplexer and demultiplexer 630 is a passive component. After the uplink data of each channel enter their respective independent receivers of the plurality of optical receivers 620, the uplink data undergoes photoelectric conversion and threshold decision processes, before the uplink data are received by the processing component 610. Thus, an CO can acquire the uplink data from each Optical Network Terminal (ONT). Once an optical receiver (e.g., the optical receiver i corresponding to channel wavelength $\lambda_i$) fails, the channel failure is detected by the detection component 615, and in response, a warning is provided to the optical network. The processing component 610, based on the channel failure information, instructs the tunable optical receiver 640 to start working and tuning its reception wavelength to the channel wavelength $\lambda_i$. The uplink data of the channel i are then received through the decoupling component 650 and the tunable optical receiver 640. For example, the decoupling component 650 is an optical coupler with at least two-way output.

Figure 7:
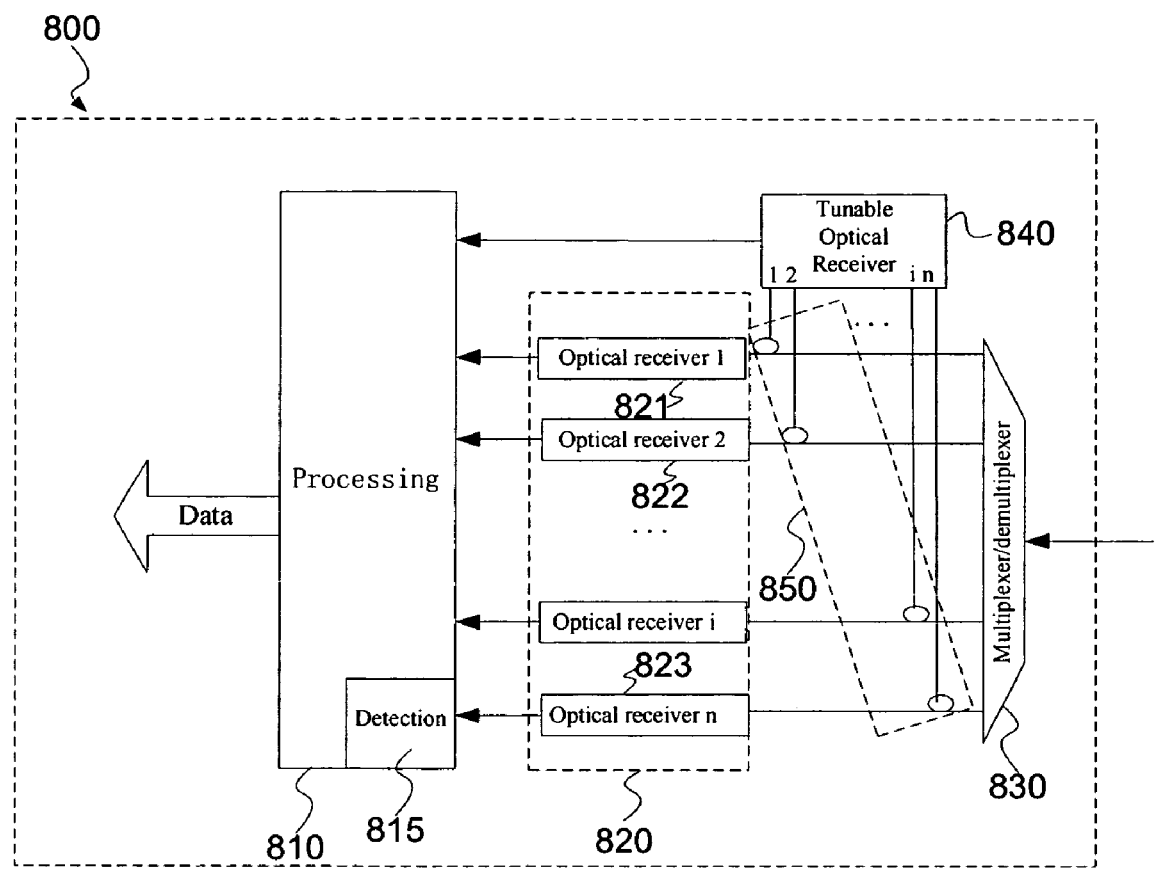
FIG. 7 is a simplified system for providing failure protection for data reception according to yet another embodiment of the present invention.

FIG. 7 is a simplified system for providing failure protection according to yet another embodiment of the present invention. This diagram is merely an example, which should not unduly limit the scope of the claims. One of ordinary skill in the art would recognize many variations, alternatives, and modifications. The system 800 includes the processing component 810, the detection component 815, the plurality of optical receivers 820, the multiplexer and demultiplexer 830, the tunable optical receiver 840, and a plurality of decoupling components 850. Although the above has been shown using a selected group of apparatuses for the system 800, there can be many alternatives, modifications, and variations. For example, some of the apparatuses may be expanded and/or combined. Other apparatuses may be inserted to those noted above. Depending upon the embodiment, the arrangement of apparatuses may be interchanged with others replaced.

The processing component 810, the detection component 815, the plurality of optical receivers 820, and the multiplexer and demultiplexer 830 are similar to the processing component 610, the detection component 615, the plurality of optical receivers 620, and the multiplexer and demultiplexer 630 respectively.

As shown in FIG. 7, the plurality of optical receivers 820 includes optical receivers 1, 2, ..., i, ..., n. n is a positive integer. i is an integer equal to or larger than 1, and equal to or smaller than n. Each optical receiver is capable of receiving an optical signal at a predetermined wavelength under at least one or more operating conditions. For example, each optical receiver is a laser receiver.

In one embodiment, the plurality of optical receivers 820 includes at least optical receivers 821 and 822. For example, the optical transmitters 821 and 822 are similar to the optical receivers 621 and 622 respectively. In another example, the optical receivers 821 and 822 are any two of the plurality of optical receivers 820. The plurality of optical receivers 820 are coupled to the plurality of decoupling components 850. The plurality of decoupling components 850 includes decoupling components 1, 2, ..., i, ..., n. For example, the decoupling component i is coupled to the input terminal i of the tunable optical receiver 840. In another example, the decoupling component i is similar to the decoupling component 650.

As shown in FIG. 7, the tunable optical receiver 840 includes a plurality of output terminals coupled to the plurality of decoupling components 850 respectively. The plurality of input terminals includes input terminals 1, 2, ..., i, ..., n. Additionally, the tunable optical receiver 840 is coupled to the detection component 815 and is capable of receiving an optical signal through at least one of the plurality of input terminals under at least one or more operating conditions. The optical signal corresponds to a wavelength $\lambda_t$. For example, the tunable optical transmitter 840 is capable of changing the wavelength $\lambda_t$ in magnitude. In another example, if the optical receiver 821 is determined not to satisfy one or more predetermined conditions, the tunable optical receiver 840 is configured to change the wavelength $\lambda_t$ so that the wavelength $\lambda_t$ becomes equal to the wavelength $\lambda_1$. Accordingly, the optical signal is selected and received from the decoupling component 1 and the input terminal 1. In one embodiment, a data signal generated by the tunable optical receiver 840 carries data information that is carried by the optical signal received by the optical receiver 821.

As discussed above and further emphasized here, FIG. 7 is merely an example, which should not unduly limit the scope of the claims. One of ordinary skill in the art would recognize many variations, alternatives, and modifications. For example, the multiplexer and demultiplexer 830 is removed.

Figure 8:
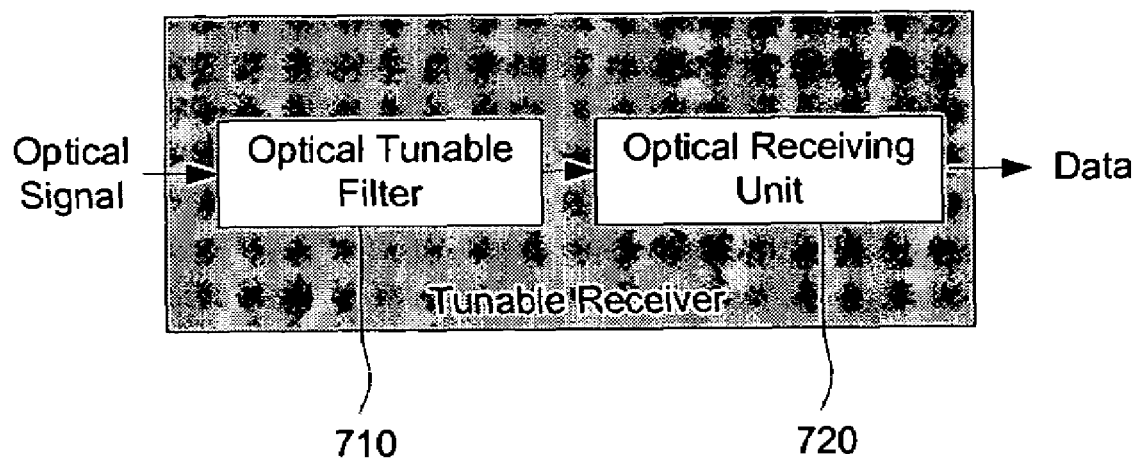
FIG. 8 is a simplified diagram showing tunable optical receiver for system for providing failure protection according to an embodiment of the present invention.

FIG. 8 is a simplified diagram showing the tunable optical receiver for the system 600 and/or the system 800 for providing failure protection according to an embodiment of the present invention. This diagram is merely an example, which should not unduly limit the scope of the claims. One of ordinary skill in the art would recognize many variations, alternatives, and modifications. The tunable optical receiver includes an optical tunable filter 710 for selecting an optical signal at wavelength $\lambda_t$, and an optical receiving unit 720 for generating data signal from the selected optical signal by at least a photoelectric process. For example, the optical tunable filter 710 includes a fiber Fabry-Perot (FP) filter, an acousto-optic tunable filter, and/or a fiber grating filter.

Figure 9:
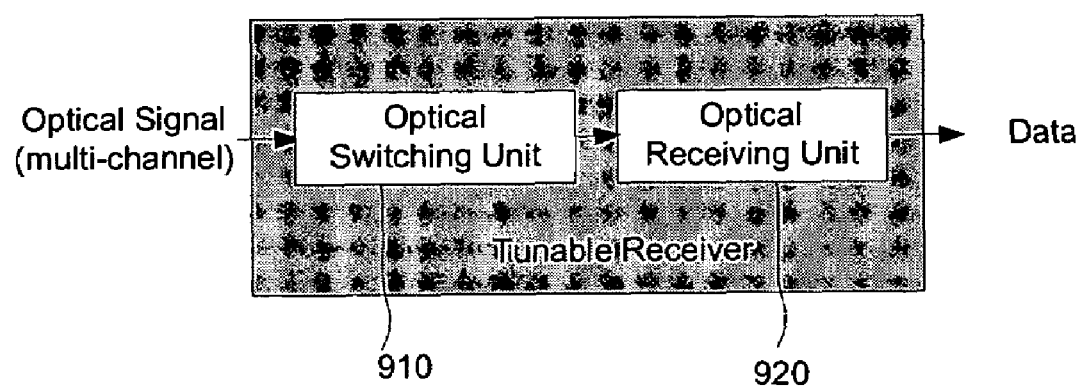
FIG. 9 is a simplified diagram showing tunable optical receiver for system for providing failure protection according to another embodiment of the present invention.

FIG. 9 is a simplified diagram showing the tunable optical receiver for the system 600 and/or the system 800 for providing failure protection according to another embodiment of the present invention. This diagram is merely an example, which should not unduly limit the scope of the claims. One of ordinary skill in the art would recognize many variations, alternatives, and modifications. The tunable optical receiver includes an optical switching unit 910 with multi-channel input and single channel output. The output wavelength of the optical switching unit is controllable. It can be implemented by an array of optical switches or a combination of wavelength demultiplexer and optical tunable filter. Also, the tunable optical receiver includes an optical receiving unit 920 for generating data signal from the selected optical signal by at least a photoelectric process. For example, the optical tunable filter 910 includes a fiber Fabry-Perot (FP) filter, an acousto-optic tunable filter, and/or a fiber grating filter.

Figure 10:
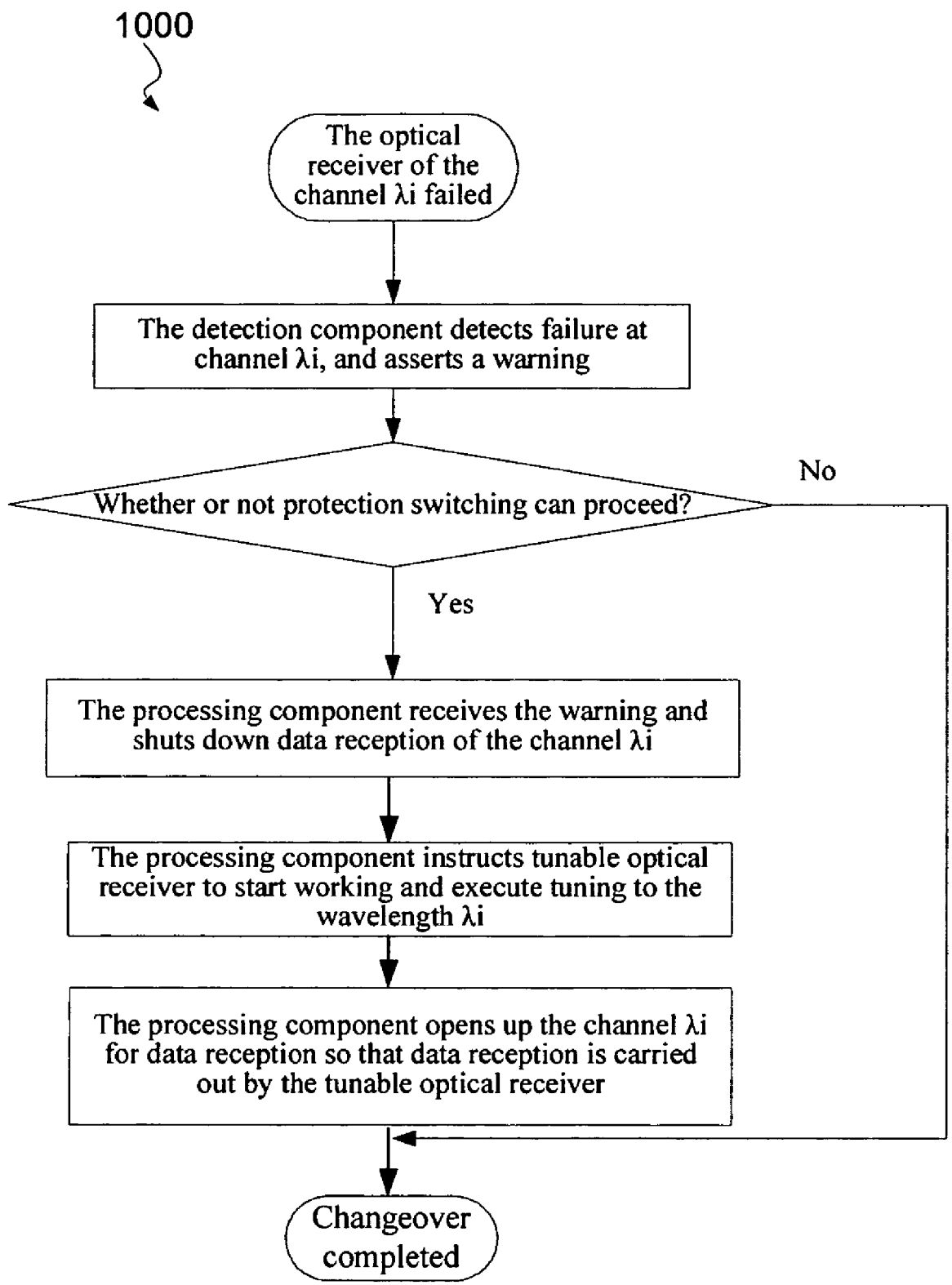
FIG. 10 is a simplified flow chart showing method for providing failure protection according to yet another embodiment of the present invention.

FIG. 10 is a simplified method for providing failure protection according to yet another embodiment of the present invention. This diagram is merely an example, which should not unduly limit the scope of the claims. One of ordinary skill in the art would recognize many variations, alternatives, and modifications.

As an example, the method 1000 is performed by the system 600. As shown in FIG. 10, when the optical receiver of the channel $\lambda_i$ fails, the detection component 615 detect this failure. Then the detection component 615 provides a warning message to the optical network such as "the optical receiver i has failed", and then determines whether or not a protection switching can proceed. For example, this determination process takes into account whether the tunable optical receiver 640 is available. If the protection switching can proceed, the processing component 610 receives the warning message and immediately shuts down the data reception on the channel $\lambda_i$ and instructs the tunable optical receiver 640 to starting working and tuning the wavelength $\lambda_t$ to the working wavelength $\lambda_i$. When the wavelength $\lambda_t$ has been tuned to the working wavelength $\lambda_i$, the protection component 615 or the processing component 620 opens up the channel $\lambda_i$ for data reception through the tunable optical receiver 640. For example, the optical receiver i remains shut down. At this point, the changeover protection is completed.

According to another embodiment, the method 1000 includes receiving a first input signal, and decoupling the first input signal to generate a second input signal and a third input signal. The third input signal includes a first optical signal corresponding to a first wavelength. Additionally, the method 1000 includes demultiplexing at least the second input signal to generate at least a second optical signal and a third optical signal. The second optical signal corresponds to a second wavelength, and the third optical signal corresponds to a third wavelength. Moreover, the method 1000 includes receiving the second optical signal to generate a first data signal, receiving the third optical signal to generate a second data signal, and determining whether the first data signal satisfies one or more predetermined conditions. Also, the method includes receiving the first optical signal corresponding to the first wavelength that is equal to the second wavelength, if the first data signal is determined not to satisfy the one or more predetermined conditions. Additionally, the method includes, if the first data signal is determined not to satisfy the one or more predetermined conditions, generating a third data signal based on at least information associated with the first optical signal, processing information associated with the second data signal and the third data signal, and generating a plurality of data based on at least information associated with the second data signal and the third data signal.

The present invention has various advantages. Some embodiments of the present invention can economically and/or efficiently solves problems of a random optical transmitter and/or receiver failure in the Central Office (CO). Certain embodiments of the present invention can improve reliability and/or robustness of downlink and/or uplink data communication in an optical network. Some embodiments of the present invention do not impose additional requirements on the regular optical transmitters and/or receivers for providing protection. Certain embodiments of the present invention do not impose additional requirements on a multiplexer and demultiplexer for providing protection. Some embodiments of the present invention do not impose demanding requirements on the emission power of a tunable optical transmitter, and/or the reception power of a tunable optical receiver. Certain embodiments of the present invention provide M:N protection by using M tunable optical transmitters for N regular wavelength channels. For example, $1 \leq M < N$. Some embodiments of the present invention do not require a system for signal transmission and a system for signal reception each have an optical channel protection module in a parallel manner. Certain embodiments of the present invention do not need to send a changeover request to the optical channel protection modules of both a transmission system and a reception system in a parallel manner. Some embodiments of the present invention provide failure protection for data transmission by transmitter changeover, instead of by wavelength changeover. Certain embodiments of the present invention provide failure protection for data reception by receiver changeover, instead of by wavelength changeover.

Some embodiments of the present invention provide a changeover protection method characterized by:
Monitoring channel failures and provide failure warnings;
Inspecting whether protection switching can proceed;
Controlling tuning of the standby tunable optical transmitter to the failed channel wavelength;
Transmitting data of the originally failed channel by the standby tunable optical transmitter that has completed transmission preparation.

Certain embodiments of the present invention provide a changeover protection system characterized by:
Having at least one standby tunable optical transmitter;
Multiplexing the normal channel data to a multiple wavelength signal, multiplexing the multiple wavelength signal and the optical signal from the standby tunable optical transmitter in order to generate another multiple wavelength signal, and sending the another multiple wavelength signal to a remote terminal;
Having a channel failure detection module for detecting channel failure and sending out a warning;
Having a processing module for deciding whether or not protection switching is executable.

Some embodiments of the present invention provide a changeover protection method characterized by:
Monitoring channel failures and provide warnings;
Inspecting whether protection switching can proceed;
Controlling tuning of the standby tunable optical receiver to the failed channel wavelength;
Receiving data of the originally failed channel by the standby tunable optical receiver that has completed reception preparation.

Certain embodiments of the present invention provide a changeover protection system characterized by:
Having at least one standby tunable optical receiver;
Receiving an optical signal in the complete wavelength range, generating at least two portions of the optical signal by a decoupling component, receiving one portion of the optical signal by the standby tunable optical receiver, using the one portion for receiving data of the failed channel, demultiplexing another portion of the optical signal into multiple channel optical signals by a multiplexer and demultiplexer, and using the multiple channel optical signals for receiving data of the normal channels;
Having a channel failure detection module for detecting channel failure, and sending out a warning.
Having a processing module which decides whether or not protection switching is executable.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A system for transmitting an optical signal, the system comprising:
a first optical transmitter capable of transmitting a first optical signal under one or more first operating conditions, the first optical signal corresponding to a first wavelength;

a second optical transmitter capable of transmitting a second optical signal under one or more second operating conditions, the second optical signal corresponding to a second wavelength;

an optical multiplexer coupled to the first optical transmitter and the second optical transmitter and capable of generating a multiplexed optical signal;

a detection component configured to determine at least whether the first optical transmitter satisfies one or more predetermined conditions;

wherein the detection component is configured to provide one or more instructions to turn off a signal path corresponding to the first optical transmitter if the first optical transmitter is determined not to satisfy the one or more predetermined conditions;

a tunable optical transmitter capable of transmitting a third optical signal, the third optical signal corresponding to a third wavelength;

an optical coupling component capable of receiving at least the multiplexed optical signal and the third optical signal and generating an output optical signal for transmission;

wherein if the first optical transmitter is determined not to satisfy the one or more predetermined conditions, the third wavelength is equal to the first wavelength.

2. The system of claim 1 wherein if the first optical transmitter is determined not to satisfy the one or more predetermined conditions, the tunable optical transmitter tunes the third wavelength such that the third wavelength is equal to the first wavelength.

3. The system of claim 1 wherein the tunable optical transmitter is capable of changing the third wavelength in magnitude.

4. The system of claim 3 wherein the tunable optical transmitter is configured to change the third wavelength so that the third wavelength becomes equal to the first wavelength if the first optical transmitter is determined not to satisfy the one or more predetermined conditions.

5. The system of claim 1, and further comprising a processing component configured to receive a plurality of data and coupled to at least the first optical transmitter, the second optical transmitter, and the tunable optical transmitter.

6. The system of claim 5 wherein the detection component is a part of the processing component.

7. The system of claim 5 wherein the processing component includes a medium access controller.

8. The system of claim 5 wherein the output optical signal includes information associated with the plurality of data.

9. The system of claim 1 wherein the first wavelength and the second wavelength are different.

10. The system of claim 1 is configured to transmit the output optical signal in an optical network.

11. The system of claim 10 wherein the optical network is a wavelength-division-multiplex passive optical network.

12. The system of claim 11 wherein the system is further configured to transmit the output signal from a central office to at least one remote node.

13. The system of claim 1 wherein if the first optical transmitter is determined not to satisfy the one or more predetermined conditions, the third optical signal carries data information that should have been carried by the first optical signal had the first optical transmitter not been determined not to satisfy the one or more predetermined conditions.

14. The system of claim 1 wherein the determine at least whether the first optical transmitter satisfies one or more predetermined conditions includes determine at least whether the first optical transmitter fails.

15. The system of claim 1, and further comprising:
a third optical transmitter capable of transmitting a fourth optical signal under one or more third operating conditions, the fourth optical signal corresponding to a fourth wavelength;
wherein the optical multiplexer is further coupled to the third optical transmitter and is further configured to generate the multiplexed optical signal in response at least the second optical signal and fourth optical signal.

16. The system of claim 1 wherein the detection component is further configured to determine whether the second optical transmitter satisfies the one or more predetermined conditions.

17. The system of claim 16, and further comprising:
another tunable optical transmitter coupled to the detection component and capable of transmitting a fourth optical signal, the fourth optical signal corresponding to a fourth wavelength;
wherein the optical coupling component further capable of receiving at least the multiplexed optical signal and the fourth optical signal and generating the output optical signal for transmission;
wherein if the second optical transmitter is determined not to satisfy the one or more predetermined conditions, the fourth wavelength is equal to the second wavelength.

18. A method for transmitting an optical signal, the method comprising:
transmitting a first optical signal by a first optical transmitter, the first optical signal corresponding to a first wavelength;
transmitting a second optical signal by a second optical transmitter, the second optical signal corresponding to a second wavelength;
multiplexing at least the first optical signal and the second optical signal to generate a multiplexed optical signal;
determining whether the first optical transmitter satisfies one or more predetermined conditions;
if the first optical transmitter is determined not to satisfy the one or more predetermined conditions,
turning off a signal path corresponding to the first optical transmitter;
transmitting a third optical signal corresponding to a third wavelength, the third wavelength being equal to the first wavelength;
coupling at least the second optical signal and the third optical signal;
generating an output optical signal for transmission.

19. A system for receiving an optical signal, the system comprising:
an optical demultiplexer capable of receiving a first input signal;
a first optical receiver coupled to the optical demultiplexer and capable of receiving a first optical signal under one or more first operating conditions, the first optical signal corresponding to a first wavelength;
a second optical receiver coupled to the optical demultiplexer and capable of receiving a second optical signal under one or more second operating conditions, the second optical signal corresponding to a second wavelength;
a detection component configured to determine at least whether the first optical receiver satisfies one or more predetermined conditions;
an optical decoupling component capable of receiving at least a second input signal and generate the first input signal and a third input signal, the third input signal including a third optical signal corresponding to a third wavelength;

a tunable optical receiver coupled to the detection component and capable of receiving the third optical signal corresponding to the third wavelength;

wherein if the first optical receiver is determined not to satisfy the one or more predetermined conditions, the third wavelength is equal to the first wavelength.

20. The system of claim 19 wherein if the first optical receiver is determined not to satisfy the one or more predetermined conditions, the tunable optical receiver tunes the third wavelength such that the third wavelength is equal to the first wavelength.

21. The system of claim 19 wherein the tunable optical receiver is capable of changing the third wavelength in magnitude.

22. The system of claim 21 wherein the tunable optical receiver is configured to change the third wavelength so that the third wavelength becomes equal to the first wavelength if the first optical receiver is determined not to satisfy the one or more predetermined conditions.

23. The system of claim 19, and further comprising a processing component coupled to at least the first optical receiver, the second optical receiver, and the tunable optical receiver and configured to generate a plurality of data.

24. The system of claim 23 wherein the detection component is a part of the processing component.

25. The system of claim 23 wherein the processing component includes a medium access controller.

26. The system of claim 23 wherein the second input signal includes information associated with the plurality of data.

27. The system of claim 19 wherein the first wavelength and the second wavelength are different.

28. The system of claim 19 is configured to receive the second input signal in an optical network.

29. The system of claim 28 wherein the optical network is a wavelength-division-multiplex passive optical network.

30. The system of claim 29 wherein the system is further configured to receive, at a central office, the second input signal from at least one remote node.

31. The system of claim 19 wherein the detection component is further configured to provide one or more instructions to turn off a signal path corresponding to the first optical receiver if the first optical receiver is determined not to satisfy the one or more predetermined conditions.

32. The system of claim 19 wherein if the first optical receiver is determined not to satisfy the one or more predetermined conditions,
the tunable optical receiver is configured to receive the third optical signal corresponding to the third wavelength and generate a data signal;
the data signal carries data information that is also carried by the first optical signal.

33. The system of claim 19 wherein the determine at least whether the first optical receiver satisfies one or more predetermined conditions includes determine at least whether the first optical receiver fails.

34. The system of claim 19, and further comprising a third optical receiver coupled to the optical demultiplexer and capable of receiving a fourth optical signal under one or more third operating conditions, the fourth optical signal corresponding to a fourth wavelength.

35. The system of claim 19 wherein the detection component is further configured to determine whether the second optical receiver satisfies the one or more predetermined conditions.

36. The system of claim 35 wherein the third input signal includes a fourth optical signal corresponding to a fourth wavelength.

37. The system of claim 36, and further comprising:
another tunable optical receiver coupled to the detection component and capable of receiving the fourth optical signal, the fourth optical signal corresponding to the fourth wavelength;
wherein if the second optical receiver is determined not to satisfy the one or more predetermined conditions, the fourth wavelength is equal to the second wavelength.

38. A method for receiving an optical signal, the method comprising:
receiving a first input signal;
decoupling the first input signal to generate a second input signal and a third input signal, the third input signal including a first optical signal corresponding to a first wavelength;
demultiplexing at least the second input signal to generate at least a second optical signal and a third optical signal, the second optical signal corresponding to a second wavelength, the third optical signal corresponding to a third wavelength;
receiving the second optical signal to generate a first data signal;
receiving the third optical signal to generate a second data signal;
determining whether the first data signal satisfies one or more predetermined conditions;
if the first data signal is determined not to satisfy the one or more predetermined conditions,
receiving the first optical signal corresponding to the first wavelength, the first wavelength being equal to the second wavelength;
generating a third data signal based on at least information associated with the first optical signal;
processing information associated with the second data signal and the third data signal;
generating a plurality of data based on at least information associated with the second data signal and the third data signal.

39. A system for transmitting a plurality of optical signals, the system comprising:
a first optical transmitter capable of transmitting a first optical signal under one or more first operating conditions, the first optical signal corresponding to a first wavelength;
a second optical transmitter capable of transmitting a second optical signal under one or more second operating conditions, the second optical signal corresponding to a second wavelength;
a detection component configured to determine at least whether the first optical transmitter satisfies one or more predetermined conditions;
a tunable optical transmitter capable of transmitting a third optical signal, the third optical signal corresponding to a third wavelength;
a plurality of optical coupling components, the plurality of optical coupling components including an optical coupling component, the optical coupling component being coupled to the first optical transmitter and the tunable optical transmitter and being configured to generate an output optical signal for transmission;
wherein if the first optical transmitter is determined not to satisfy the one or more predetermined conditions, the third wavelength is equal to the first wavelength.

* * * * *

UNITED STATES PATENT AND TRADEMARK OFFICE
CERTIFICATE OF CORRECTION

PATENT NO. : 7,660,529 B2  
APPLICATION NO. : 11/517815  
DATED : February 9, 2010  
INVENTOR(S) : Wei et al.

It is certified that error appears in the above-identified patent and that said Letters Patent is hereby corrected as shown below:

Title page, Item [56] References Cited, U.S. Patent Documents, add --6,172,782* 01/2001 Kobayashi 398/9--

Title page, Item [56] References Cited, U.S. Patent Documents, add --7,233,738* 06/2007 Kerfoot 398/10--

Title page, Item [56] References Cited, U.S. Patent Documents, add --7,426,346* 09/2008 Wang et al. 398/5--

Signed and Sealed this

Fifteenth Day of June, 2010

David J. Kappos  
*Director of the United States Patent and Trademark Office*

UNITED STATES PATENT AND TRADEMARK OFFICE
CERTIFICATE OF CORRECTION

PATENT NO. : 7,660,529 B2  Page 1 of 1
APPLICATION NO. : 11/517815
DATED : February 9, 2010
INVENTOR(S) : Wei et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 736 days.

Signed and Sealed this

Thirtieth Day of November, 2010

David J. Kappos
*Director of the United States Patent and Trademark Office*